(12) United States Patent
Linderman et al.

(10) Patent No.: US 9,353,970 B2
(45) Date of Patent: May 31, 2016

(54) DRIVE WITH INTEGRATED INCLINATION SENSOR

(71) Applicant: SunPower Corporation, San Jose, CA (US)

(72) Inventors: Ryan Linderman, Oakland, CA (US); Nicholas Barton, Richmond, CA (US)

(73) Assignee: SUNPOWER CORPORATION, San Jose, CA (US)

( * ) Notice: Subject to any disclaimer, the term of this patent is extended or adjusted under 35 U.S.C. 154(b) by 359 days.

(21) Appl. No.: 13/730,592

(22) Filed: Dec. 28, 2012

(65) Prior Publication Data
US 2014/0182577 A1 Jul. 3, 2014

(51) Int. Cl.
*F24J 2/38* (2014.01)
*H02S 20/32* (2014.01)
*F24J 2/54* (2006.01)

(52) U.S. Cl.
CPC .. *F24J 2/38* (2013.01); *F24J 2/541* (2013.01); *H02S 20/32* (2014.12); *F24J 2002/5462* (2013.01); *F24J 2002/5468* (2013.01); *Y02E 10/47* (2013.01)

(58) Field of Classification Search
CPC ......... Y02E 10/47; Y02E 10/58; H02S 20/32; F24J 2/38; F24J 2002/385; F24J 2/541; F24J 2/5424
See application file for complete search history.

(56) References Cited

U.S. PATENT DOCUMENTS

| 4,445,030 | A | * | 4/1984 | Carlton | 126/578 |
| 6,128,135 | A | * | 10/2000 | Stiles et al. | 359/597 |
| 8,973,570 | B2 | * | 3/2015 | Stavrou et al. | 126/573 |
| 2010/0175741 | A1 | | 7/2010 | Thorne | |
| 2011/0079213 | A1 | | 4/2011 | Lam | |
| 2011/0108112 | A1 | | 5/2011 | Hong et al. | |
| 2012/0152308 | A1 | | 6/2012 | Miller et al. | |
| 2012/0216852 | A1 | | 8/2012 | Almy et al. | |
| 2014/0014159 | A1 | * | 1/2014 | Polk | 136/246 |

OTHER PUBLICATIONS

International Search Report and Written Opinion dated Mar. 26, 2014, from International Application No. PCT/US2013/074300 filed Dec. 11, 2013, 10 pages.

* cited by examiner

*Primary Examiner* — David J Laux
(74) *Attorney, Agent, or Firm* — Knobbe, Martens, Olson & Bear LLP

(57) ABSTRACT

A drive can include a positional sensor within an outer housing of the drive so as to provide an output indicative of a position of the drive. The positional sensor can be an inclinometer. The inclinometer can be used for feedback control of an inclination of the drive. The drive can further include control electronics within the same housing, so as to provide feedback control of a motor of the drive. The control electronics can include an input for receiving a requested inclination and can be configured to drive the motor until the inclinometer outputs a signal indicative of the requested angle.

20 Claims, 12 Drawing Sheets

DRIVE WITH INTEGRATED INCLINATION SENSOR

TECHNICAL FIELD

The inventions disclosed herein generally relate to drive systems for controlling a tilting motion, such as, for example, drives for sun-tracking solar collection systems.

BACKGROUND

Some larger solar collector installations include an array of sun-tracking, solar power collector assemblies. Such assemblies can be used in conjunction with photovoltaic modules, concentrated photovoltaic modules, as well as concentrated thermal solar collector devices.

Such sun-tracking collectors include hardware for automatically adjusting the position of the collector devices to track the sun as it moves across the sky. This tracking movement can be accomplished in a number of different ways. Some systems use a single axis tracking system in which the collector devices pivot about a single axis. Such single axis type tracking systems often include a drive shaft or "torque tube" which defines a single pivot axis.

Concentrated photovoltaic solar systems can provide significant cost savings over non-concentrated photovoltaic systems. This is because concentrated photovoltaic systems only use a fraction of the amount of photovoltaic material to collect about the same amount of sunlight. However, sun-tracking accuracy becomes more important with concentrated systems. For example, it is known that efficiency of a solar collector can drop if the mirrors of a concentrated system are misaligned by as little as 0.1°. Thus, high performance of such systems is more likely to be achieved if the components of the concentrated systems are manufactured to precise tolerances. Additionally, such concentrated photovoltaic systems are more affordable, if the hardware and/or labor required to construct such a system is reduced.

BRIEF SUMMARY

An aspect of at least one of the inventions disclosed herein includes the realization that hardware and labor costs associated with drive systems can be reduced by improving motors with additional sensing capabilities. For example, in some known drive systems that are used for pivoting solar collectors for sun-tracking purposes, inclinometers are disposed on specific components of a sun-tracking solar collection system. In some known systems, the inclinometer is placed on or at a predetermined location relative to a solar collection device so that as the device is tilted through a sun-tracking motion, a signal indicative of the angle of the solar collection device is output by the sensor. This output of the sensor is used to selectively control a drive system to orient the solar collection device at desired angles and through desired movements.

In such systems, the inclinometer is placed with a high degree of precision. Additionally, the inclinometer must be connected to either a "smart motor" or another part of a control system in order to provide feedback signal of an actual detected angle of the collector. Such an inclinometer must be also weatherproof and include weatherproof electrical connections, which presents a significant cost of that hardware.

Thus, an aspect of at least one of the inventions disclosed herein includes the realization that significant hardware and labor costs can be avoided by incorporating an inclinometer into a motor housing. As such, the additional cost associated with weatherproof electrical connections and housings for the inclinometer can be avoided. For example, known motors used for outdoor applications include weatherproof enclosures. Thus, by adding an inclinometer to the inside of such a weatherproof housing can entirely avoid the need for weatherproofing of the sensor and its electrical connections.

This type of arrangement is particularly beneficial where a drive unit includes a motor with such an integrated inclination sensor in which the motor itself is mounted to a moveable part of the drive unit. Thus, the inclination sensor and the motor move together through a pivoting motion during use.

Another aspect of at least one of the inventions disclosed herein includes the realization that an inclination sensor can be connected to a motor controller circuit board so as to further reduce the need of connector cables. For example, drive units that include a motor housing having a drive controller circuit board housed therein can be connected to a separate inclination sensor circuit board with any type of cable, such as a universal serial bus, a ribbon connector, or other type of connector. However, such an arrangement requires separate mounting portions for separately mounting the two circuit boards, plus additional circuit board conductors protruding off of the circuit board for connection to cable connectors, such as flexible ribbon type connectors or other cables.

An aspect of at least one of the inventions disclosed herein includes the realization that further costs can be avoided by incorporating or mounting an inclination sensor directly to a motor controller circuit board. As such, the electrical contacts of the inclination sensor can be directly connected to the motor controller with conductive pathways printed directly on the circuit board, thereby avoiding the need for additional conductors to protrude through the circuit board and the associated connector mounts that would be necessary for cable connections.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
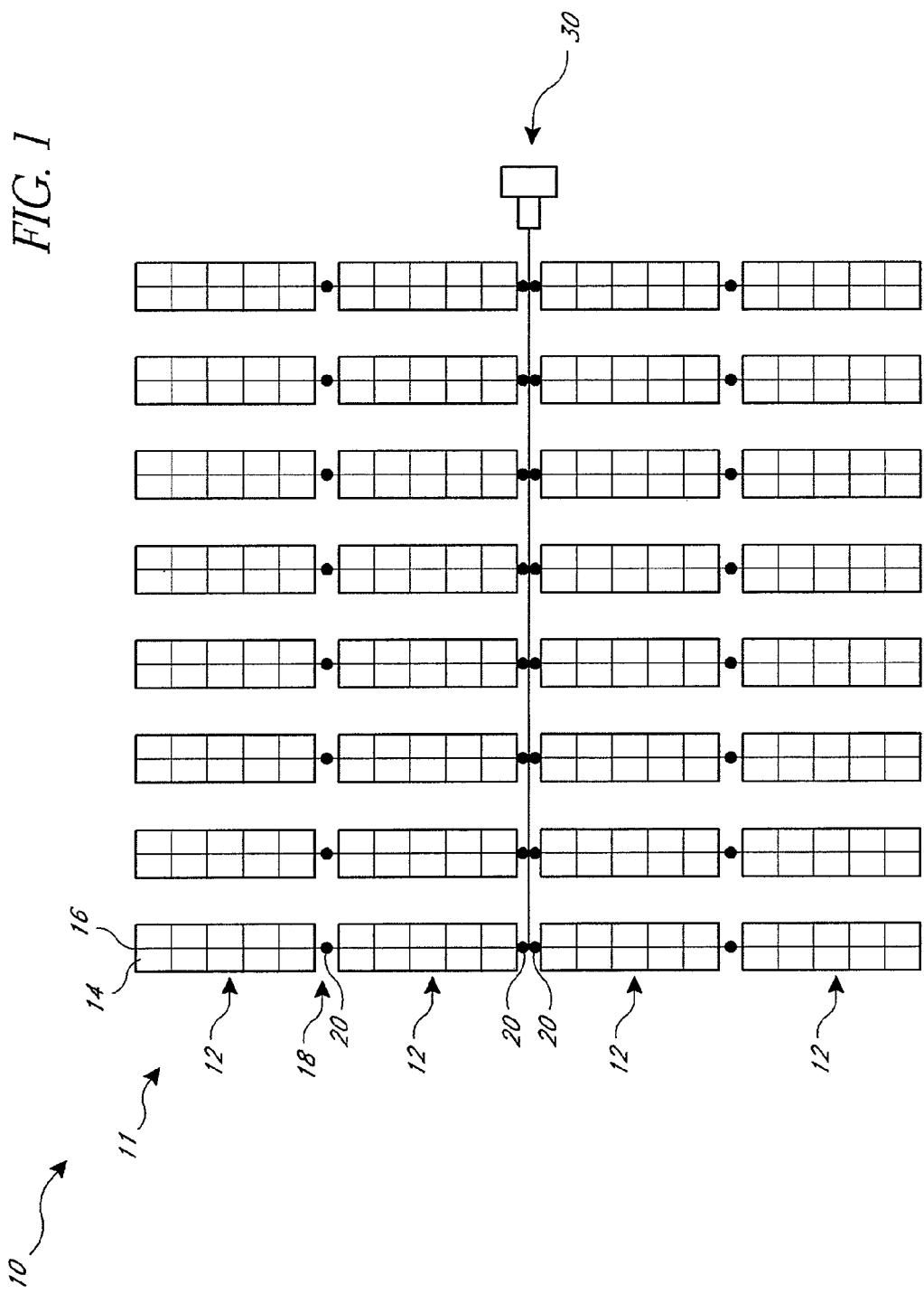
FIG. 1 is a schematic top plan view of a solar collector system.
Figure 2:
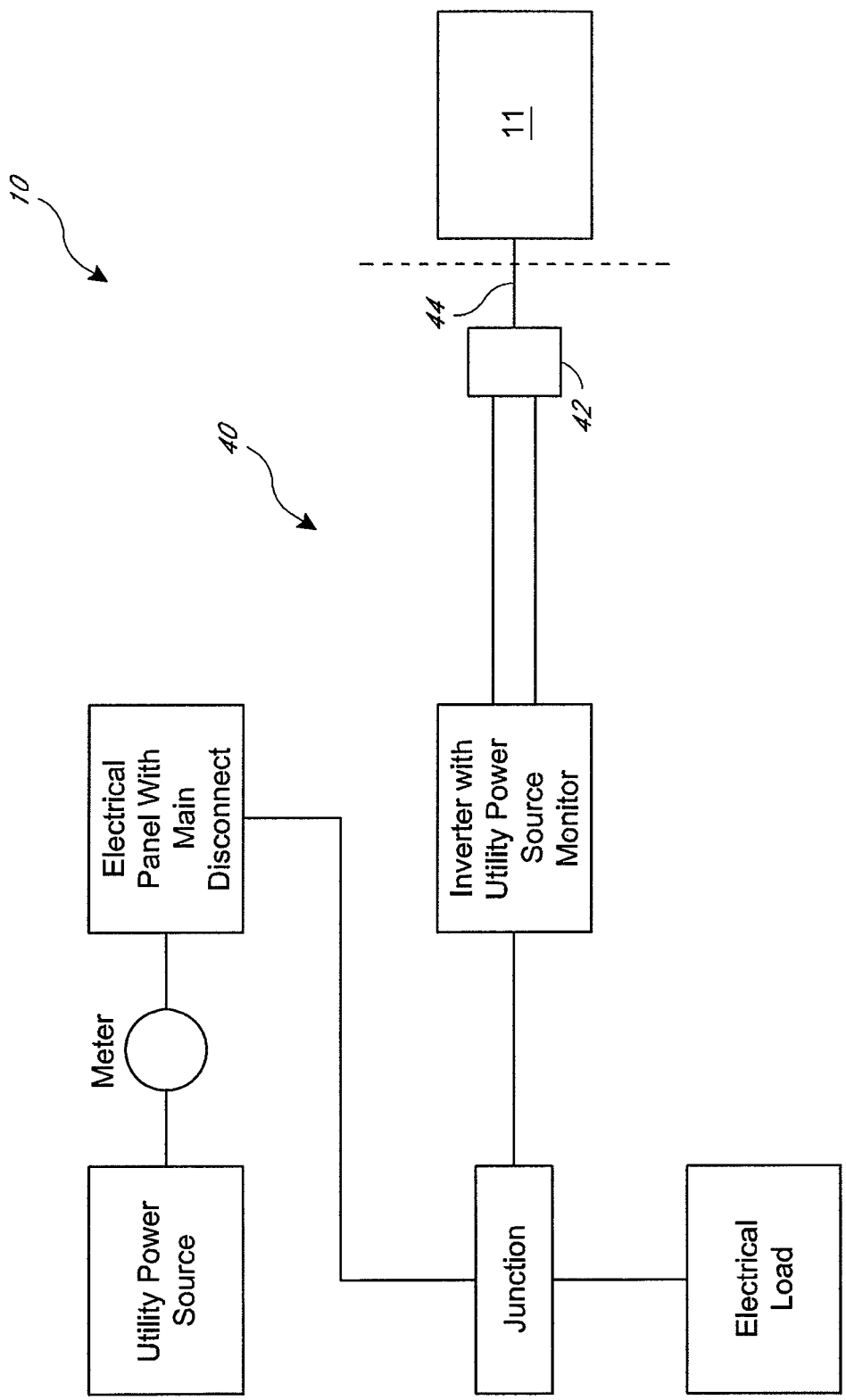
FIG. 2 is a schematic diagram of the system illustrated in FIG. 1 including optional electrical connections of the collector system with various electrical components.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The inventions disclosed herein are described in the context of non-concentrated and concentrated photovoltaic arrays and modules. However, these inventions can be used in other contexts as well, such as concentrated thermal solar systems, etc.

In the description set forth below, a solar energy collection system 10 is described in the context of being formed by a plurality of solar collection modules, pivotally adjusted for sun-tracking purposes by a drive which has a motor with an integrated inclination sensor. Each of the modules can include a support member supporting a plurality of solar collection devices, which can be concentrated or nonconcentrated solar collection devices as well as wiring for connecting the various solar collection devices to each other and to other modules.

The system 10 can also include devices for reducing labor, hardware, or other costs associated with installing such a system. Specifically, for example, a sun-tracking drive can include an integrated inclination sensor, which can reduce the cost of installation and/or hardware of such a system.

FIGS. 1-4 illustrate different environments in which the inventions disclosed herein can be used. FIG. 1 is a schematic illustration of a solar collection system 10, which can be considered an electricity farm operating under a concentrated or non-concentrated principle.

The solar collection system 10 can include a solar collector array 11 which includes a plurality of solar collection modules 12. Each of the solar collection modules 12 can include a plurality of solar collecting devices 14 supported by a drive shaft or torque tube 16. Each of the torque tubes 16 are supported above the ground by a support assembly 18. Each of the support assemblies 18 can include a pile and a bearing assembly 20.

With continued reference to FIG. 1, the system 10 can also include a tracking system 30 connected to the torque tubes 16 and configured to pivot the torque tube 16 so as to cause the associated collector devices 14 to track the movement of the sun. In the illustrated embodiment, the torque tubes 16 are arranged generally horizontally and the modules 12 are electrically connected to each other, as more fully described in U.S. patent application Ser. No. 13/176,276, filed Jul. 5, 2011, the entire contents of which is hereby expressly incorporated by reference. The tracking system can include a single motor and drive components adapted to drive a plurality of parallel torque tube assemblies (e.g., assemblies comprising a series of axially aligned torque tubes connected end-to-end), or a plurality of motors, each connected one or a plurality of axially aligned torque tubes 16.

Optionally, the system 10 can include a plurality of modules 12 supported by torque tubes 16 that are inclined relative to horizontal, wherein the torque tubes 16 are not connected in an end to end fashion, such as the arrangement illustrated and disclosed in U.S. Patent Publication No. 2008/0245360. The entire contents of the 2008/0245360 patent publication is hereby expressly incorporated by reference including the illustrations and the descriptions of the bearings 40 and 72. Further, the inventions disclosed herein can be used in conjunction with the systems that provide for controlled tilting about two axes, although not illustrated herein.

The solar collection devices 14 can be in the form of photovoltaic panels, thermal solar collection devices, concentrated photovoltaic devices, or concentrated thermal solar collection devices.

The solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 3:
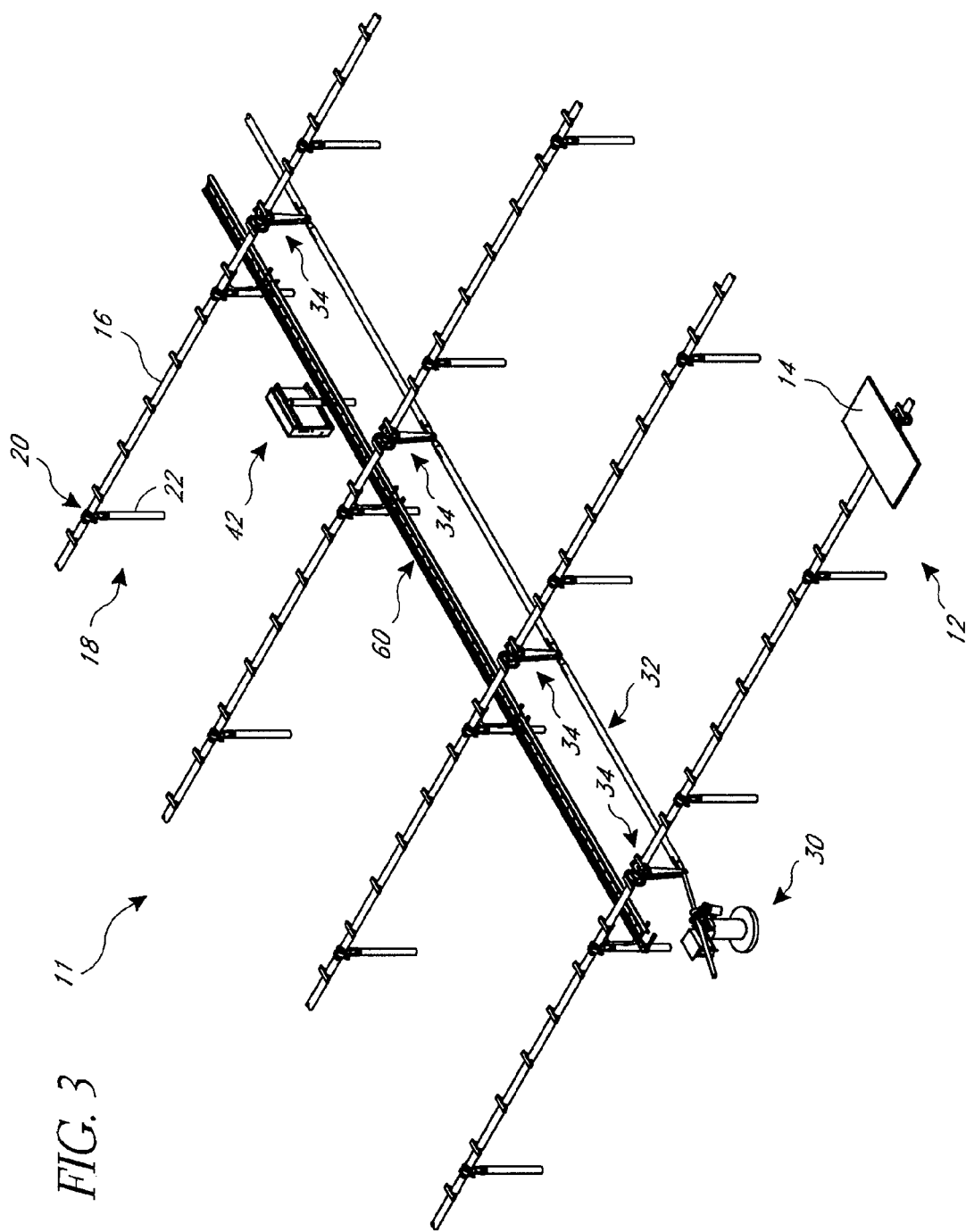
FIG. 3 is a perspective view of a non-concentrated photovoltaic embodiment of the solar collection system of FIG. 1, illustrating a plurality of piles mounted to the ground and supporting a plurality of torque tubes with a sun-tracking drive in accordance with an embodiment.

FIG. 3 illustrates a non-concentrated photovoltaic, sun-tracking embodiment of the array 11 with all but one of the solar collection devices 14 removed. As shown in FIG. 3, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, and other factors.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include an electrical wire tray 60 supported by one or more of the piles 22, or by other means.

Figure 4:
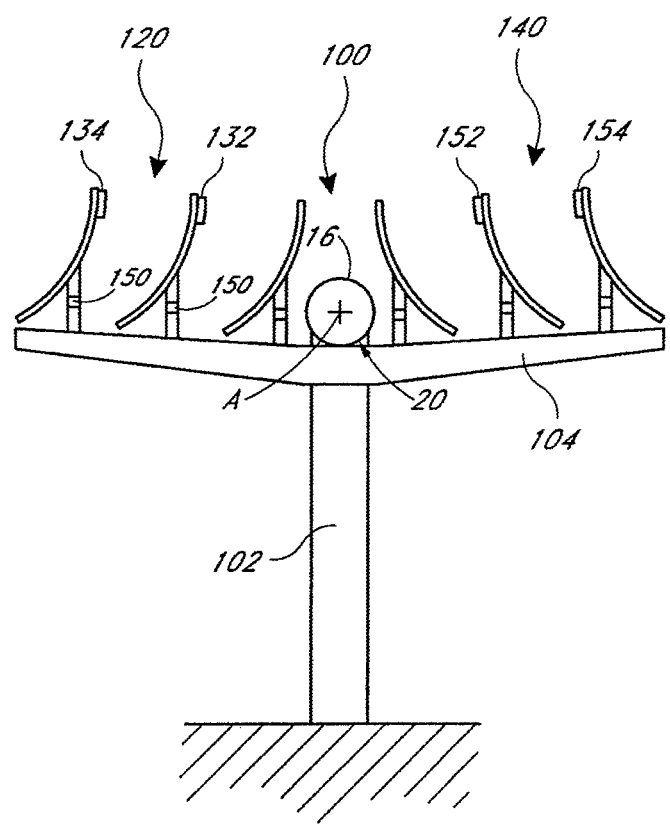
FIG. 4 is a schematic side elevational view of a solar collector assembly for a concentrated photovoltaic embodiment of the solar collection system of FIG. 1, in which the present sun-tracking drive can also be used.
Figure 5:
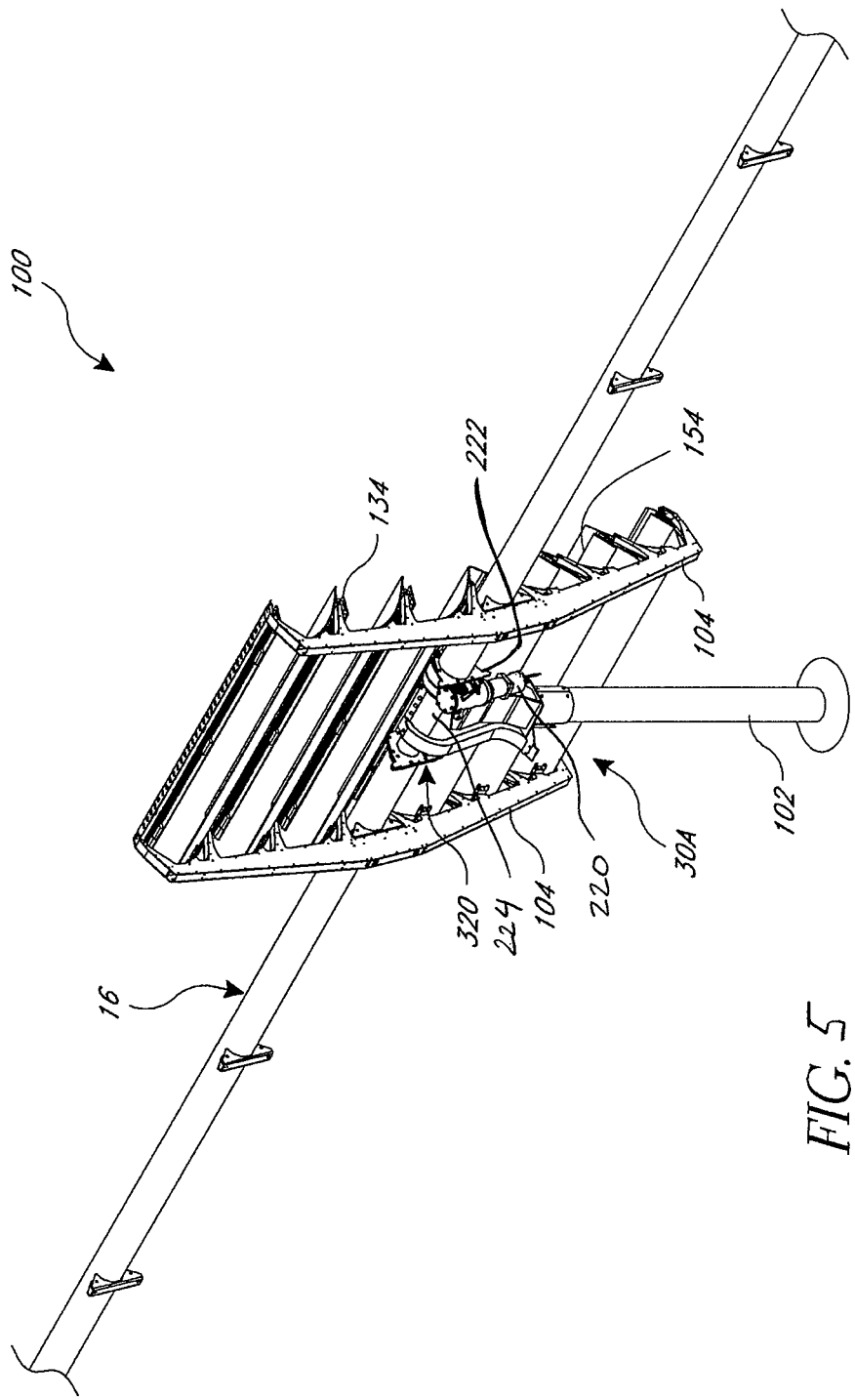
FIG. 5 is a perspective view of the embodiment of FIG. 4 and including a sun-tracker drive.

FIGS. 4 and 5 illustrate components of a concentrated photovoltaic, sun-tracking embodiment of the array 11. For example, as schematically shown in FIG. 4, a concentrated photovoltaic solar assembly 100 can include a pile 102 which supports one or more cross beams 104 and a torque tube 106. The cross beam 104 in turn supports first and second groups of concentrating elements 120, 140, supported by the cross beam 104.

In the illustrated embodiment, one group of concentrating elements 120 face in one direction and the second group of concentrating elements 140 are positioned so as to face the opposite direction, with the changeover between them occurring at the torque tube 106. The pier 102 can be a single post or one of several supporting the solar concentrator assembly 100.

Connectors 150 support the concentrator elements 120, 140 relative to the cross beam 104. Additionally, photovoltaic collectors 132, 134, 152, 154 can be mounted on the back sides of the concentrator elements 120, 140. In this configuration, each of the concentrator elements 120, 140 are configured to focus a band of concentrated light onto the photovoltaic units 132, 134, 152, 154. A sun-tracking drive system 200 can drive the torque tube 16 to pivot about the pivot axis A. Further detail regarding the optional configuration of a concentrated photovoltaic environment of use is set forth in U.S. patent application Ser. No. 12/977,006 filed Dec. 22, 2010, the entire contents of which is hereby incorporated by reference.

The bearings 20 can be supported directly on piers 102 described above with reference to FIGS. 1-4. Optionally, the bearings 20 can be supported upon an optional bearing supports 202. Further details about the bearings are set forth in U.S. patent application Ser. No. 13/333,964, filed Dec. 21, 2011, the entire contents of which is hereby expressly incorporated by reference. Other bearings can also be used.

FIG. 5 is a perspective view of an embodiment including the concentrated photovoltaic collector assembly illustrated in FIG. 4, with a further embodiment of the sun-tracker drive 30, identified generally by the reference numeral 30A. All of the descriptions noted above with respect to the environment of use and connectivity of the drive 30 also applies to the descriptions set forth below of the sun-tracker drive 30A. The position of the photovoltaic collector assembly 100 illustrated in FIG. 5 is a position that can be used more conveniently for accessing and servicing the sun-tracker drive 30A, but is not a position generally used during generation of electricity.

Figure 6:
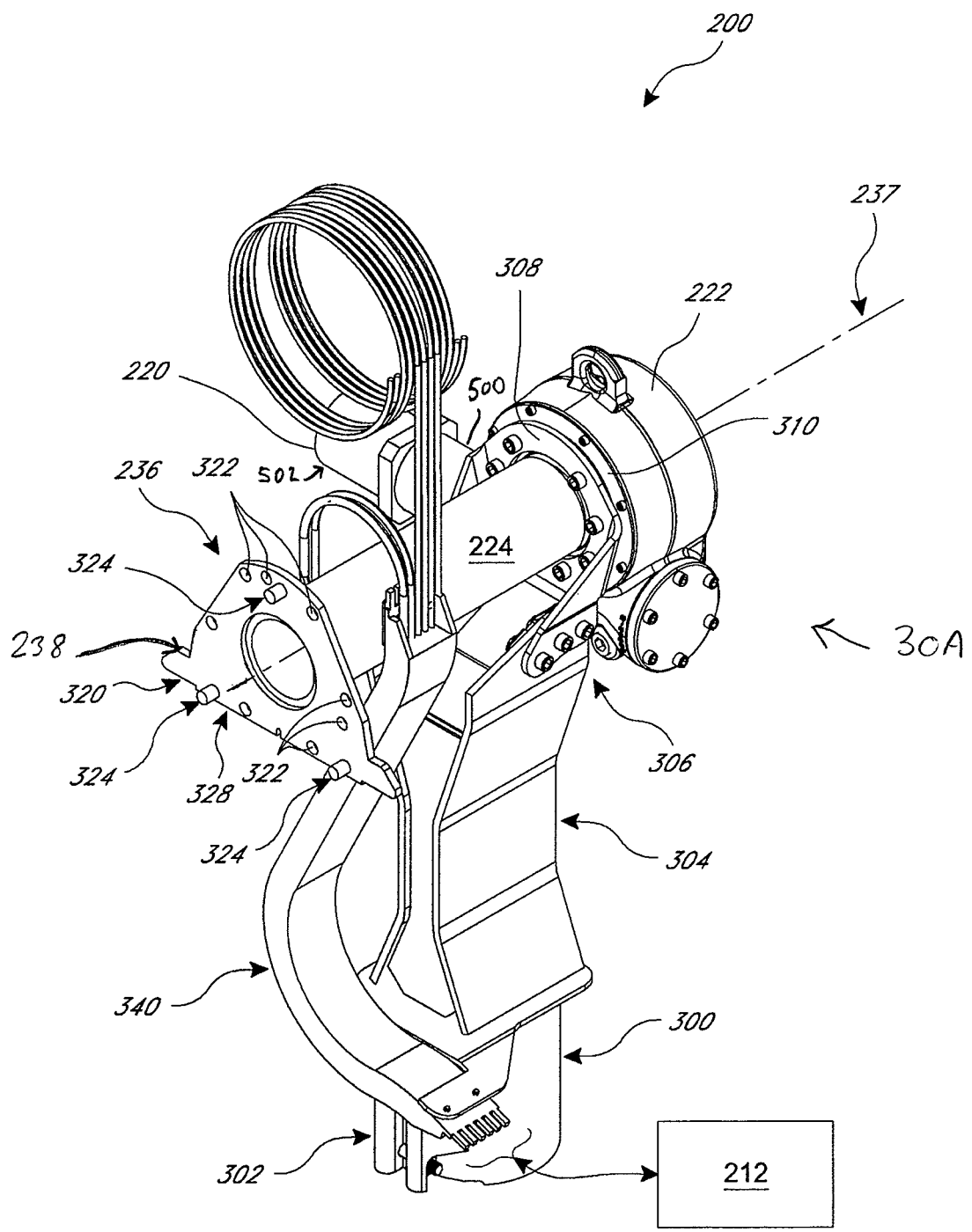
FIG. 6 is an enlarged perspective view of the sun-tracker drive of FIG. 5
Figure 7:
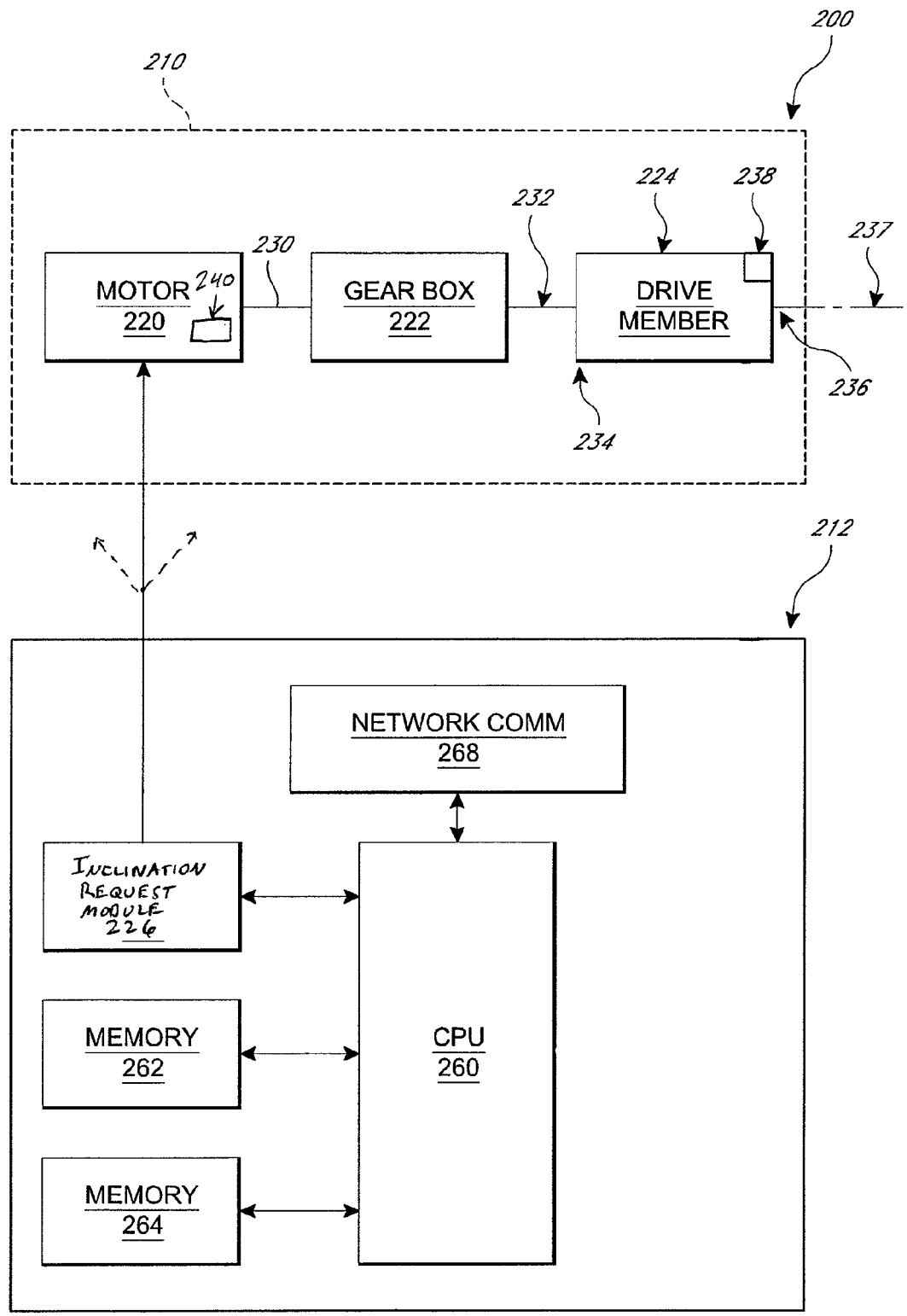
FIG. 7 is schematic diagram of a controller that can be used with the sun-tracker drive of FIGS. 5 and 6.

With reference to FIGS. 5 and 6, the sun-tracking drive 30A can include a drive assembly 210 and a drive controller 212. As shown in FIG. 7, the drive assembly 210 can include a motor 220, a gearbox 222 and a drive member 224.

The motor 220 can be any type of drive motor including, for example, but without limitation, a DC motor, an AC motor, a servo motor, shunt motor, induction motor, stepper motor, etc. Other electric motors can also be used.

An output shaft 230 of the motor is connected to an input of the gearbox 222. The gearbox can be any type of gearbox, and be configured to provide any desired output gear ratio. In the illustrated embodiment, the gear reduction ratio of the gearbox 222 is about 36000:1. In some embodiments, as described below, the gearbox 222 is configured such that its output shaft 232 is at a 90° angle relative to the output shaft 230. This type of motor and gearbox combination is commercially available and typically referred to as a "gearmotor".

With continued reference to FIGS. 5 and 6, the drive member 224 includes an input end 234 connected to the gearbox 222 and an output end 236 configured for connection to a torque tube 16. For example, the output end 236 can include a pattern of fastener points, such as holes for threaded fasteners, arranged to provide a secure attachment to an identical or similar member on a torque tube 16.

In some embodiments, the drive member 224 can include a reference surface 238. The reference surface 238 can be of any shape or orientation. In some embodiments, the reference surface 238 is configured to provide a conveniently accessible surface that can be used to engage instrumentation for purposes, such as, but without limitation, verify an orientation of the drive member 224 with high precision. The drive 30A can also include an integrated inclination sensor ("inclinometer").

The controller 212 can be configured to provide appropriate control over the motor 220 for any purpose. In the illustrated embodiment, the controller 212 can be configured to provide control information to the drive 30A for sun-tracking purposes.

For example, the controller 212 can send signals or data to the drive 30A which can be considered "inclination requests". For example, in some embodiments, the controller 212 can be provided with known software for predicting the appropriate angle of inclination for a concentrated solar collector to provide the proper focus onto the proper location, such as the photovoltaic units 132, 134, 152, 154 (FIG. 5) based on the location of the drive 30A on the earth, the time of day, and the date. Such calculations are well-known in the art and will not be described herein in any greater detail.

Having calculated the desired inclination angle, the controller 212 can be configured to transmit a signal indicative of the desired inclination angle to the drive 30A. Such communication can be provided with any known technique. Further, in some embodiments, the controller 212 can be configured to perform calculations for all of the drives 30A that may be included in a solar farm, such as the system 10 (FIG. 1). As is known in the art, even the small differences between the geographical locations of solar collectors throughout a solar farm can require different angles of inclination for each drive to provide optimal focus of solar radiation onto the photovoltaic collectors 132, 134, 152, 154. Thus, the controller 212 can be configured to broadcast or sequentially distribute individual inclination requests to each drive 30A. For example, each drive 30A can be associated with an individual IP address and such inclination angle request can be distributed with known digital communication techniques.

In such a configuration in which the controller 212 issues inclination requests to the drives 30A, the drives 30A can include the appropriate electronics for performing feedback control so as to orient the torque tube 16 to the requested inclination and to maintain that inclination. For example, the motors 220 can be in the form of what is commonly known as "smart motors" which include dedicated controllers configured to receive positional request data or signals, and to automatically control operation of the motor operation so as to achieve a requested position. In the illustrated embodiments, the drive 30A includes a smart motor 220 having an integrated inclination sensor 240.

With continued reference to FIG. 6, in some embodiments, the controller 212 can include a central processing unit (CPU) 260, one or more memory devices 262, 264, and inclination request module 266. Optionally, the controller 212 can include a network communication device 268.

The CPU 260 can be in any known configuration. For example, the CPU 260 can be a purpose-built computer processor, designed to provide the functions described below with regarding to controlling an orientation of the drive member 224. Alternatively, the CPU 260 can be in the form of a general-purpose processor, along with software providing an operating system for performing the functions noted above and described below. In other embodiments, the controller 212 can be in the form of a hardwired control system, in which the CPU 260 represents a logical circuit, configured to provide the functions noted above and described below.

Inclination request module 266 can be configured to receive data representing a calculation of the desired inclination and to output a signal or data corresponding to the desired inclination output by the CPU 260 and transmit that data or signal to the motor 220. The inclination request module 226, thus, can be configured to output a signal or data that can be read by the motor 220.

The memory devices 262, 264, as well as other memory devices, can be used to store instructions for performing the functions described below, such as the methods illustrated in FIGS. 8 and 9, as well as other functions and methods. Such stored instructions can be considered as non-transitory, computer readable media. Additionally, one of the memory devices 262, 264 can be used to store reference information, such as an output value from the inclinometer 240, described in greater detail below with regard to FIG. 8.

The inclination request module 226, in some embodiments, can be used to receive and transmit data and/or signals across a network (not illustrated) to and from the CPU 260.

With continued reference to FIG. 6, the sun-tracker drive 30A can include a lower portion 300 configured to provide a secure mount to a pile, such as the piles 102, illustrated in FIGS. 1-4. In the illustrated embodiment, the lower portion 300 includes a clamp portion 302 for adjusting the tightness of the connection between the lower portion 300 and the pile 102.

In the illustrated embodiment, an hourglass-shaped intermediate portion 304 extending from the lower portion 300 to a support portion 306. The intermediate portion 304, in the illustrated embodiment, is made from a plurality of metal plates, welded together. However, other configurations can also be used.

The upper portion 306 is configured to provide a stable mount for the hardware of the drive 30A. A mounting plate 308 connects the upper portion 306 to a mounting face 310 of the gearbox 222.

The input end 234 (FIG. 7) of the drive member 224 is connected to an output shaft 232 of the gearbox 222. Optionally, in other embodiments, an additional drive member (not illustrated) can be mounted to the opposite side of the gearbox 222.

With continued reference to FIG. 6, the drive member 224 includes a drive plate 320 securely mounted to the output end 236 of the drive member 224. The drive plate 320 includes one or more apertures 322 for receiving fasteners for providing a secure connection to a torque tube, such as the torque tube 16 (FIGS. 5 and 6). Optionally, the plate 320 can also include one or more optional alignment pins 324. Such alignment pins can be shaped and arranged to provide a high-precision connection to the torque tube 16. For example, but without limitation, the pins 324 and corresponding recesses formed on a mating drive plate on a torque tube 106, can be configured to maintain an alignment between the drive member 224 and the torque tube to a tolerance of ½ a degree, 1/10th of a degree, 5/100ths of a degree or less.

Additionally, in some embodiments, the reference surface 238 can be formed on a lower surface of the drive plate 320. As noted above, in some embodiments, the reference surface 238 can be machined flat and oriented such that the reference surface 238 is horizontal relative to gravity when a corresponding collector assembly is in a horizontal orientation.

The embodiment of FIG. 6 also includes an optional wire loom 340 which is configured to protect the various wires extending between the controller 212 and the drive hardware 210. Other connections and wire looms can also be used.

Figure 8:
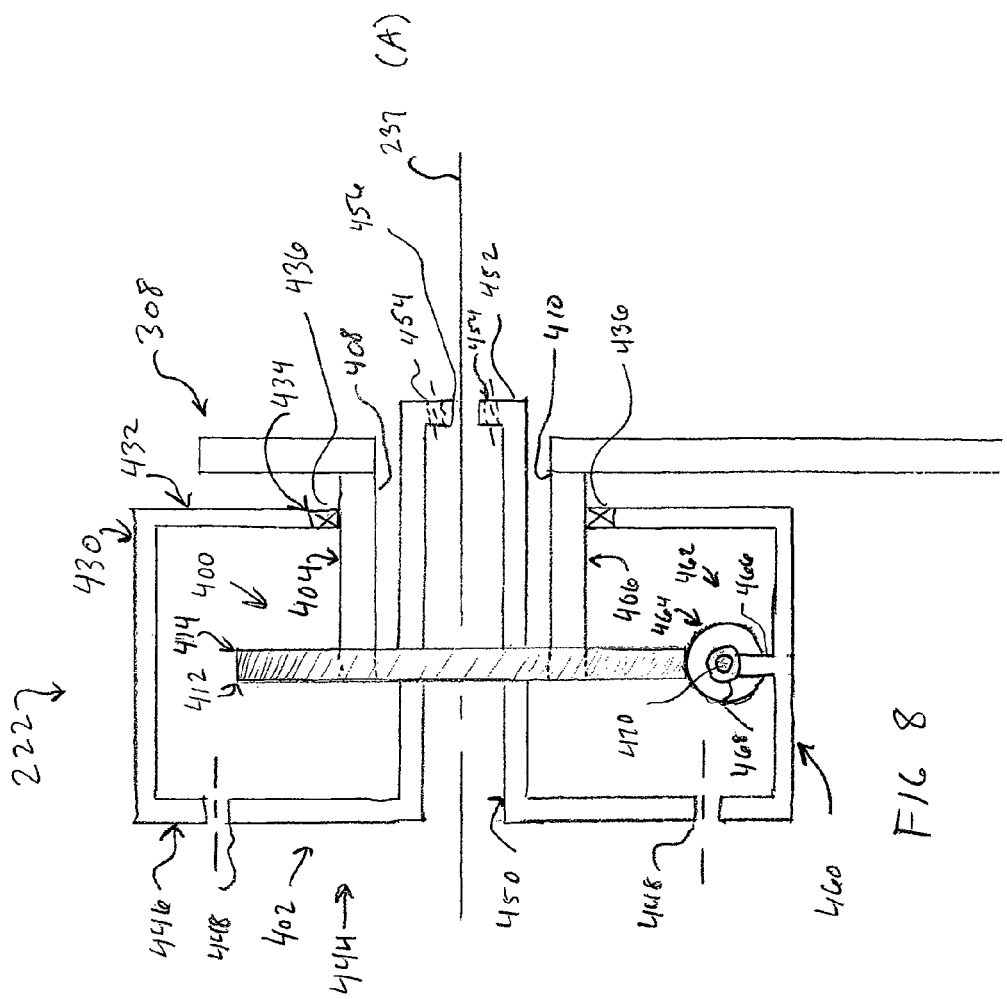
FIG. 8 is a schematic cross-sectional view of a gearbox of the sun-tracking drive of FIGS. 5 and 6.
Figure 9:
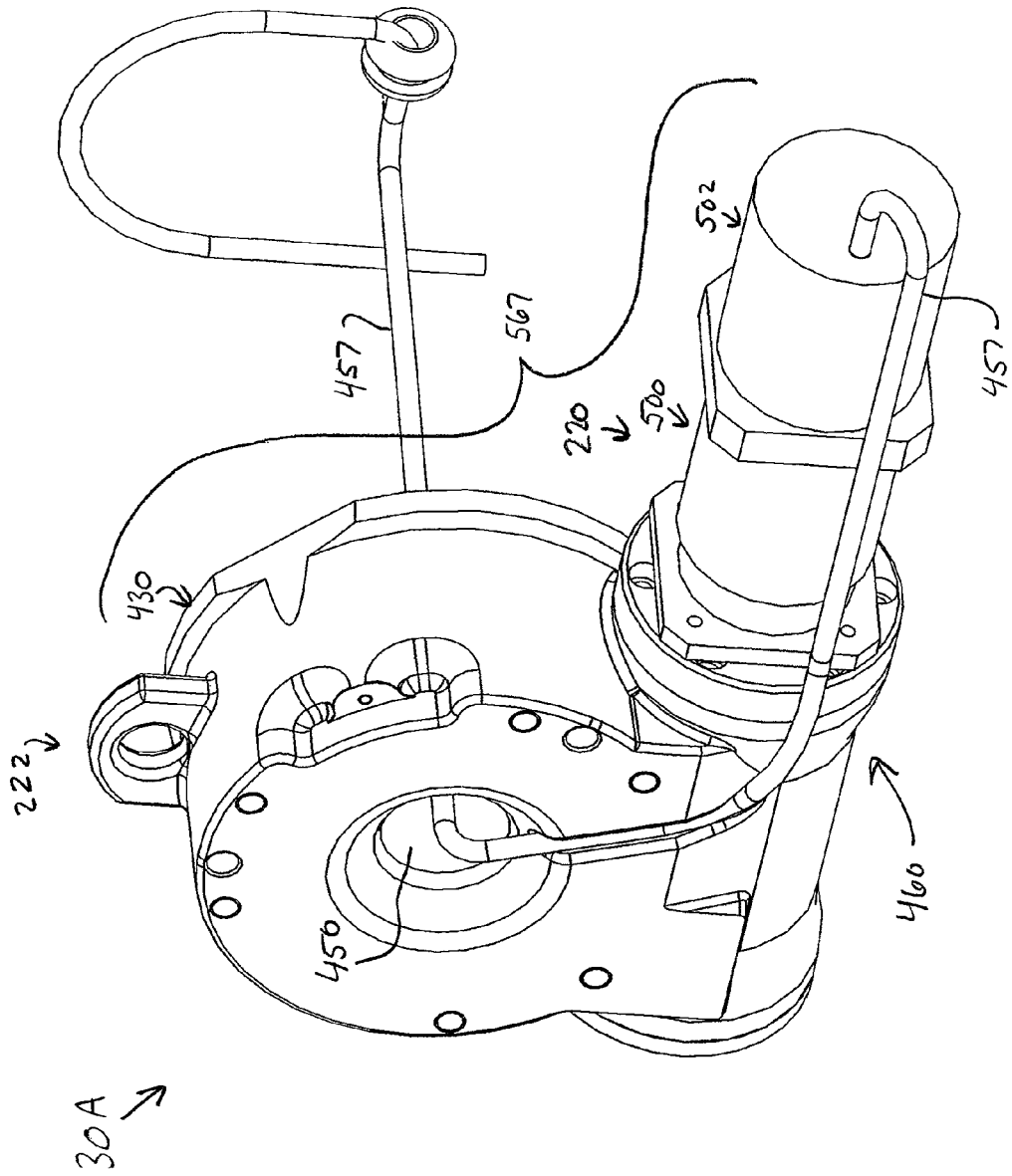
FIG. 9 is an enlarged perspective view of the drive of FIGS. 5 and 6.
Figure 10:
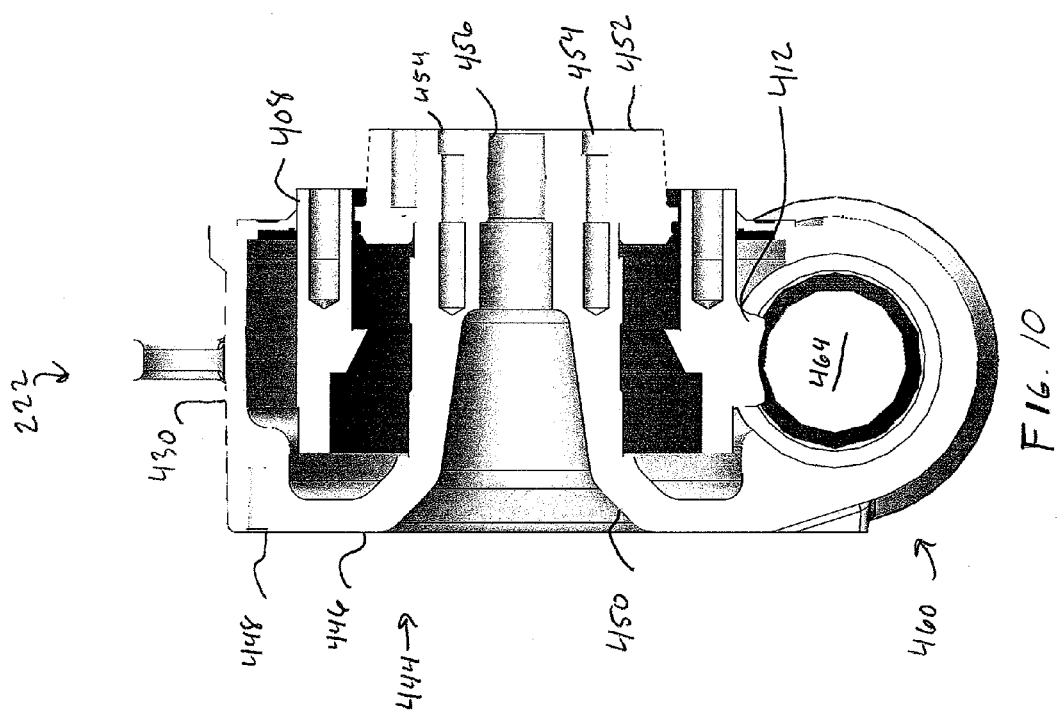
FIG. 10 is a cross-sectional view of an embodiment of FIG. 9.

FIG. 8 illustrates a schematic representation of components of the gearbox 222 to assist the reader's understanding of the structure and operation of the gearbox 222. FIG. 9 illustrates a cross sectional view of the gearbox 222.

The gearbox 222 can be considered as including two assemblies, a fixed portion 400 and a pivoting portion 402. The fixed portion 400 can include a mounting member 404 configured to be attachable to the mounting plate 308 (FIG. 6). In some embodiments, the mounting portion 404 can be in the configuration of a shaft having an outer surface 406 and an inner surface 408. One axial end 410 of the mounting portion 404 can be configured to be fixed to the mounting plate 308 in any known manner, such as, for example, but without limitation, bolt holes and threaded fasteners.

The fixed portion 400 can also include a gear 412 having external teeth 414. The gear 412, and mounting portion 404 can be rigidly attached to one another.

The pivotable portion 402 can be configured to define an external housing around most or nearly all of the gearbox 222, as well as a portion of an external housing of the drive 30A. For example, the pivotable portion 402 can include a ring shaped or substantially ring shaped outer housing member 430.

The outer housing member 430 can include a first wall section 432 having an inner end 434 mounting for rotational support by the fixed portion 400. For example, the inner end 434 can be rotationally supported by the fixed portion 404 with a bearing 436. Supported as such, the rotatable portion 402 can rotate about a rotational axis 440 of the drive 30A. The rotational axis 440, when the drive 30A is installed, becomes rotational axis A of the torque tubes (FIG. 4).

The rotatable housing 430 can also include an outer portion 444 extending generally transverse to the axis A and generally parallel to the inner portion 432. The outer portion 444 can include a mounting face 446 configured to be joinable with torque tubes. For example, the mounting face 446 can include a plurality of bolt holes 448 sized and spaced to provide fixed rotational connection to mounting plates for torque tubes, described in greater detail below with reference to FIG. 9.

The rotatable housing 430 can also include a central portion 450 extending from an inner end of the outer portion 444 and generally parallel to the axis 440. As illustrated in FIGS. 8, 9A and 9B, the central portion 450 extends from the inner end of the outer portion 444, and extends outwardly beyond the inner portion 432 of the housing 430. At a longitudinal end of the central portion 450 opposite from the outer portion 444, the central portion can include a mounting face 452 which can also be configured for attachment to torque tubes. For example, the mounting face 452 can include a plurality of bolt holes 454 configured for a fixed rotational connection to the drive member 224 (FIG. 6). With reference to FIG. 6, in the illustrated embodiment, the drive member 224 includes an inwardly extending flange with a bolt hole pattern configured to match to the bolt hole pattern of the bolt holes 454.

Further, the mounting face 452 can also include a central passage 456 such that the entire rotatable housing 430 has a centrally extending passage that can be used for accommodating electrical cables, such as a power cable 457 (FIG. 9A) for providing power to the motor 220.

The rotatable housing 430 can also include a motor mounting portion 460. The motor mounting portion 460 can include a drive gear mounting portion 462 configured to rotatably support a drive gear 464 relative to the rotatable housing 430.

For example, the motor mounting portion 460 can include a mount 466 and the bearing 468 for rotatably supporting a shaft 470 and thereby the gear 464. However, any configuration can be used.

The gear 464 is configured to mesh with the teeth 414 of the fixed gear 412. Thus, as the gear 464 is rotated, and because the fixed gear 412 is fixed relative to the rotatable housing 430, the rotatable housing 430 is driven around the axis 440.

With returning reference to FIG. 6, as noted above, the motor 220 is mounted to the gearbox 222. More specifically, the motor 220 is engaged with the gear 464 so as to drive the gear 464 relative to the fixed gear 412 (FIGS. 8 and 9B) and thereby rotate the entire rotatable housing 430 along with the motor 220 during operation, so as to pivot the torque tubes 20. Thus, the outer housing 430 of the gearbox 222 as well as the outer housing of the motor 220 (described in greater detail below) together can be considered as forming an outer housing 567 of the entire rotatable portion of the drive 30A. In the illustrated embodiment, the outer housing 567 is also rotatable relative to the fixed portions of the system 10, including the ground. Additionally, the outer housing 567 can be weatherproof. The outer housing can be considered to be a "pivoting housing".

Figure 11:
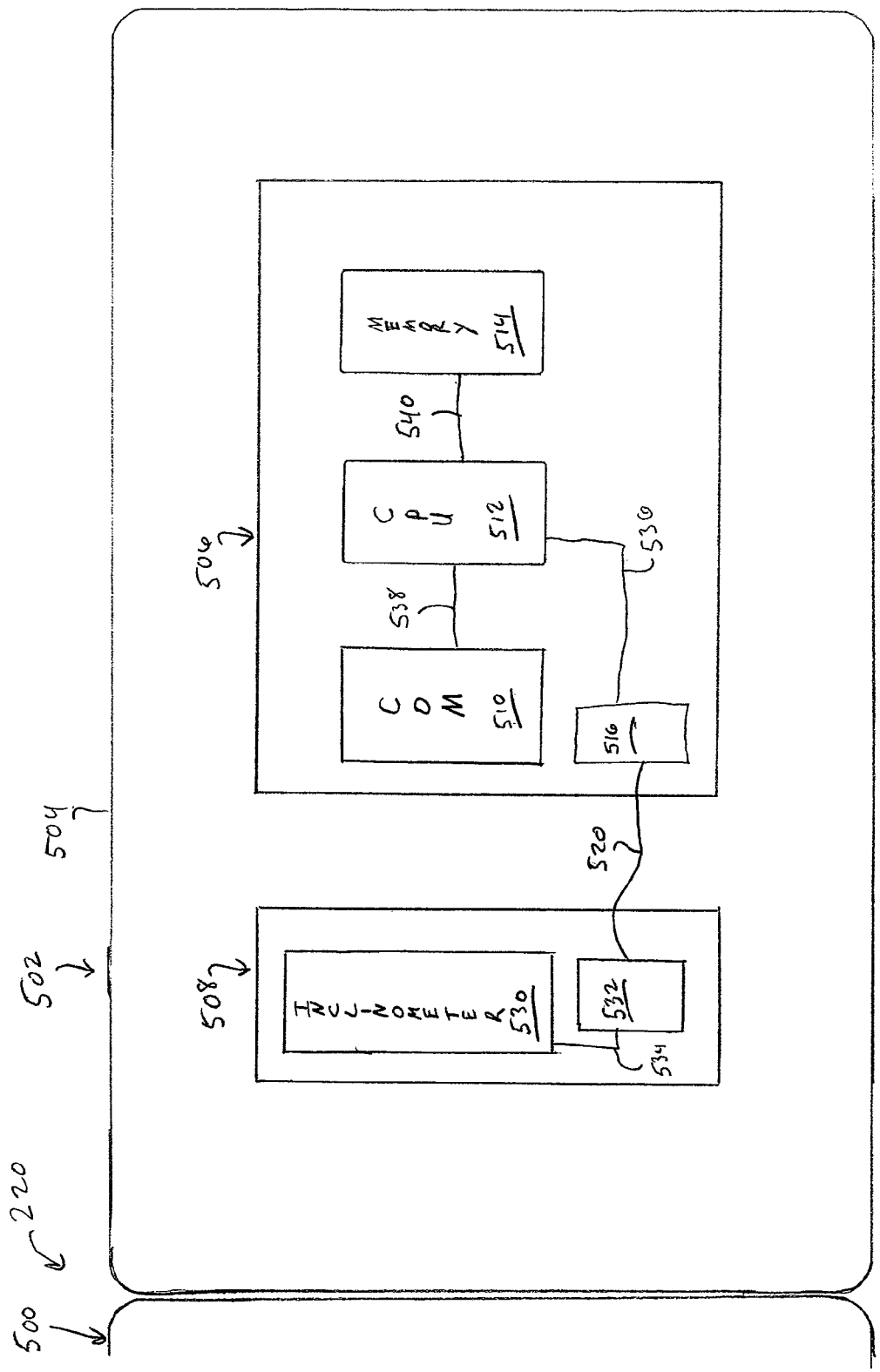
FIG. 11 is a schematic diagram of circuit boards within a motor enclosure.

With reference to FIG. 11, a portion of the motor 220 is illustrated schematically therein. The motor 220 can include an electric motor portion 500 and a controller portion 502. The motor portion 500 of the motor 220 can include an electric motor, either AC or DC, of any known type, as noted above. The construction of electric motors is well-known in the art and thus further detail regarding the motor portion 500 will not be described herein.

The controller portion 502 can include circuitry configured to drive the electric motor within the motor portion 500, in any known manner.

In some embodiments, as noted above, the motor 220 can be in the form of a "smart motor". Thus, for example, the motor 220 can be configured to receive signals or data that represent a desired position or a desired number of rotations through which the motor portion 500 should be driven.

In the illustrated embodiment, the controller portion 502 is configured to receive an inclination request and to drive the electric motor within the motor portion 500 until the solar collectors are oriented at the requested inclination. Thus, the control portion 502 can include a weatherproof housing 504 enclosing all the necessary control electronics including a controller circuit board 506, an inclinometer circuit board 508, as well as any other required components, which are well-known to those of ordinary skill in the art, such as switches for controlling operation of the electric motor within the motor portion 500.

The controller circuit board 506 can include a communications module 510, a central processing unit 512, a memory module 514, and a wiring harness connector 516.

The CPU 512 can be any known configuration. For example, the CPU 512 can be a purpose built computer processor, designed to provide the functions described below with regard to controlling the orientation of the drive 30A. Alternatively, the CPU 512 can be in the form of a general purpose processor, along with software, for example stored in the memory module 514, providing an operating system for performing the functions noted above and described below. In other embodiments, the controller circuit board 506 can be in the form of a hard wired control system, in which the CPU 512 represents a logical circuit, configured to provide the functions noted above and described below.

The memory device 514 can be used to store instructions for performing the functions noted above, for example, receiving an inclination request and controlling the motor within the motor portion 500 to drive the motor until the desired inclination is achieved. For example, such an operation method can operate under the principle of a feedback control method in which an output from an inclinometer, such as the inclinometer sensor 530, is used as reference to determine when the desired inclination has been reached.

The communications module 510 can be any type of communication module, for example, such as those used for Ethernet communications or other network communications protocols.

The connector 516 can be a standard connector used to connect pathways on the circuit board 506 to an external connector such as a ribbon connector 520 for connecting the circuit board 506 with other devices.

The inclinometer circuit board 508 can include an inclinometer sensor 530 and a connector 532. The inclinometer sensor 530 can be any type of inclinometer sensor commercially available. Preferably, the inclinometer sensor 530 is a proportional type inclinometer providing a signal or output that is proportional to an angle at which the inclinometer 530 is positioned. The inclinometer circuit board 508 can be fixed with any type of mount relative to the outer housing 504 of the controller portion 502. As such, as a rotatable portion 402 of the gearbox 222 rotates about the axis 237, the inclinometer 530 also rotates about the axis 237 and thus changes its output proportionally to the inclination relative thereto.

The inclinometer circuit board 508 can include printed circuit paths 534 connecting the inclinometer sensor 530 with the connector 532. Although only one path 534 is illustrated, the inclinometer sensor 530 may have a plurality of individual paths leading to the connector 532. Similarly, the connector 532 can include a plurality of contacts, corresponding to the number of paths 534, so as to connect to a corresponding number of wires, which may be connected in a ribbon connector 520, for connecting the output of the inclinometer sensor 530 to the controller circuit board 506.

The controller circuit board 506 can also include a corresponding number of printed paths 536 for connecting the output of the inclinometer 530 to the CPU 512. The controller circuit board 506 can also include other printed circuit pads between the communications module 510 and the CPU (538) and pathways 540 between the CPU 512 and the memory 514. Of course, the controller circuit board 506 can also include other printed circuit paths for providing other outputs as necessary and as is well-known in the art.

In such embodiments, where the inclinometer sensor 530 is integrated with the drive 30A, for example, such that the inclinometer sensor 530 is mounted anywhere within the outer housing 567, significant cost savings can be realized. For example, in some known prior art designs, the inclinometer is mounted external to the outer housing of a motor or gear motor, on a reference surface formed on a portion of a torque tube or connecting mounting flange. As such, the inclinometer itself would need a separate weatherproof casing, weatherproof connector wires, and weatherproof fittings going out of its own housing into the associated electronics to which it is connected.

However, by integrating an inclinometer 530 into outer housing 567 of the drive 30A, those additional separate weatherproof housings and connections are no longer necessary and thus significant hardware savings can be realized.

Figure 12:
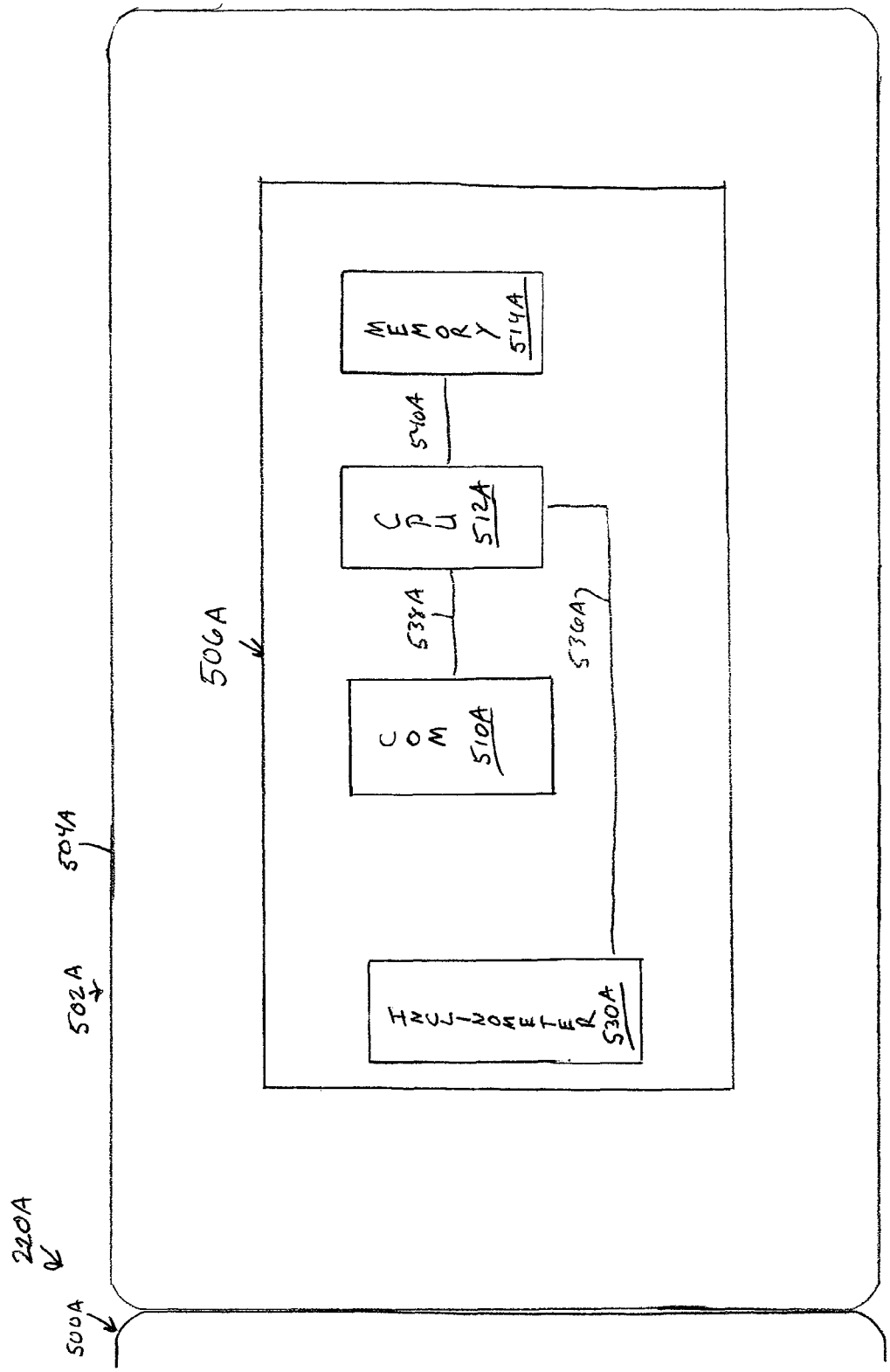
FIG. 12 is a schematic view of a motor controller circuit board with an integrated inclination sensor.

FIG. 12 illustrates another embodiment of the motor 220, identified by the reference numeral 220A. The components of the motor 220A that are the same or similar to the motor 220 described above, are identified with the same reference numeral except that a letter A have been added thereto.

The motor 220A includes an inclinometer integrated onto the controller circuit board 506A. As such, the motor 220A eliminates the need for a separate circuit board such as the separate circuit board 508 (FIG. 11). Additionally, the motor 220A obviates the need for the separate connectors 532, 516, and the wire 520. As such, the motor 220A provides further cost savings compared to the embodiment of the motor 200 illustrated in FIG. 11.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A sun-tracking motor for a solar energy collection device, comprising:
   a first mounting portion configured to be mounted to a fixed member relative to the Earth;
   a pivoting motor housing;
   a motor at least partially disposed within the pivoting motor housing, the motor engaged with the first mounting portion such that the motor drives the pivoting motor housing about a pivot axis relative to the first mounting portion;
   a motor controller disposed within the pivoting motor housing; and
   an inclination sensor disposed within the pivoting motor housing,
   wherein the motor and the inclination sensor pivot with the pivoting motor housing about the pivot axis.

2. The sun-tracking motor according to claim 1, wherein the motor controller comprises a motor controller circuit board, the motor controller circuit board being electrically connected to the motor, the motor controller circuit board being configured to receive an inclination signal from the inclination sensor.

3. The sun-tracking motor according to claim 2, wherein the inclination sensor is mounted to the circuit board.

4. The sun-tracking motor according to claim 2, wherein the motor controller circuit board is configured to receive an inclination request and to drive the motor to an inclination corresponding to the inclination request.

5. The sun-tracking motor according to claim 2, wherein the inclination sensor is mounted to an inclination circuit board which is separate from and connected to the motor controller circuit board.

6. The sun-tracking motor according to claim 5, wherein the inclination sensor circuit board comprises at least a first communications module configured to transmit a signal indicative of a detected inclination.

7. The sun-tracking motor according to claim 1, wherein the motor controller is configured to receive an inclination request signal, an inclination signal from the inclination sensor, and to drive the motor until the motor controller receives a signal from the inclination sensor that corresponds to the inclination corresponding to the inclination request signal.

8. The sun-tracking motor according to claim 1, further comprising a first gear engaged with the motor such that the motor rotates the first gear about a first rotational axis, the first rotational axis non-parallel with the pivot axis.

9. The solar energy collection system according to claim 8, further comprising a second gear engaged with the first gear such that rotation of the first gear about the first rotational axis causes the second gear to rotate parallel to the pivot axis.

10. A sun-tracking, solar energy collection system, comprising:
    a frame;
    at least one solar energy collection device supported by the frame;
    a driver assembly configured to pivot the frame through a range of sun-tracking pivot motion about a pivot axis, the driver assembly comprising:
       a fixed portion mounted so as to be fixed relative to the Earth; and
       a pivoting portion engaged with the fixed portion, the pivoting portion comprising:
          a pivoting housing enclosing a motor; and
          a motor controller configured to control operation of the motor, the motor being engaged with the fixed portion such that when the motor is driven, the pivoting housing pivots relative to the fixed portion so as to pivot the frame and the motor along the range of sun-tracking pivot motion about the pivot axis; and
       an inclination sensor disposed inside the pivoting housing such that the inclination sensor pivots with the pivoting housing about the pivot axis, the inclination sensor configured to detect an inclination of the motor and to output a signal indicative of inclination detected by the inclination sensor.

11. The solar energy collection system according to claim 10, wherein the motor controller comprises a motor controller circuit board, the motor controller circuit board being electrically connected to the motor, the motor controller circuit board being configured to receive an inclination signal from the inclination sensor.

12. The solar energy collection system according to claim 11, wherein the inclination sensor is mounted to the circuit board.

13. The solar energy collection system according to claim 11, wherein the motor controller circuit board is configured to drive the motor to an inclination corresponding to an inclination request signal.

14. The solar energy collection system according to claim 11, wherein the inclination sensor is mounted to an inclination circuit board which is separate from and connected to the motor controller circuit board.

15. The solar energy collection system according to claim 14, wherein the inclination sensor circuit board comprises at least a first communications module configured to transmit a signal indicative of a detected inclination.

16. The solar energy collection system according to claim 10, wherein the motor controller is configured to receive an inclination request signal, an inclination signal from the inclination sensor, and to drive the motor until the motor controller receives a signal from the inclination sensor that corresponds to the inclination corresponding to the inclination request signal.

17. The solar energy collection system according to claim 10 additionally comprising at least a first support pier fixed to the Earth, the fixed portion being fixed to the first support pier.

18. The solar energy collection system according to claim 10, wherein the motor is offset from the pivot axis in a direction transverse to the pivot axis.

19. The solar energy collection system according to claim 10, further comprising a first gear engaged with the motor such that the motor rotates the first gear about a first rotational axis, the first rotational axis non-parallel with the pivot axis.

20. The solar energy collection system according to claim 19, further comprising a second gear engaged with the first gear such that rotation of the first gear about the first rotational axis causes the second gear to rotate parallel to the pivot axis.

* * * * *